United States Patent [19]

Ganiaris

[11] 4,099,947

[45] Jul. 11, 1978

[54] CONCENTRATION OF COMESTIBLE LIQUIDS

[75] Inventor: Neophytos Ganiaris, Riverdale, N.Y.

[73] Assignee: Struthers Patent Corporation, Houston, Tex.

[21] Appl. No.: 771,128

[22] Filed: Feb. 23, 1977

Related U.S. Application Data

[62] Division of Ser. No. 320,594, Jan. 2, 1973, abandoned.

[51] Int. Cl.² .............................................. B01D 9/04
[52] U.S. Cl. ......................................... 62/532; 62/542

[58] Field of Search ................. 62/532, 541, 542, 543, 62/544; 426/384, 385, 490, 492, 495

[56] References Cited

U.S. PATENT DOCUMENTS 3,205,078  9/1965  Lund ...................................... 62/542

Primary Examiner—Norman Yudkoff
Attorney, Agent, or Firm—William Anthony Drucker

[57] ABSTRACT

Orange or other fruit juice is concentrated by forming ice therein and separating the ice from the juice in a draining column followed by centrifugation.

3 Claims, 1 Drawing Figure

U.S. Patent July 11, 1978 4,099,947
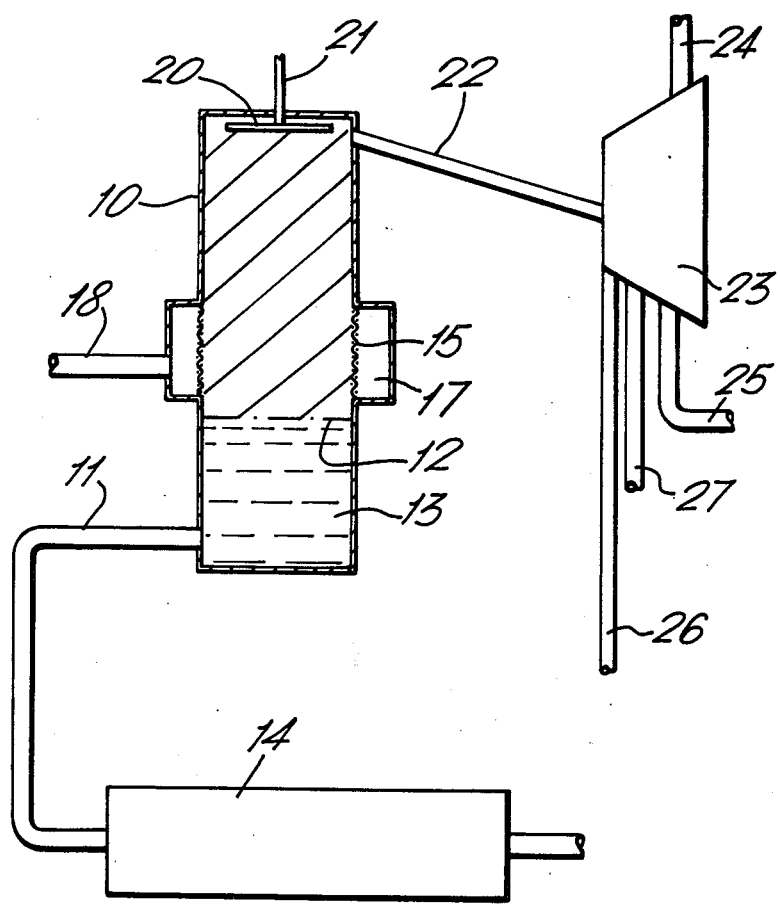

CONCENTRATION OF COMESTIBLE LIQUIDS

This is a division of Ser. No. 320,594 filed Jan. 2, 1973, now abandoned.

This invention relates to the concentration of aqueous solutions of orange juice.

It is known to subject such solutions to freeze concentration to form ice crystals in the solution and to separate the ice from the concentrated liquor by a centrifuge. The ice although mostly water does carry some useful solids mainly on its surface and it is known to wash the ice in the centrifuge with wash water, e.g., melted ice and to recover the solids from the wash water, e.g., by using the wash water.

The object of the present invention is to recover solids from the ice more efficiently or with less costly equipment.

According to the present invention the ice slurry is fed to a draining column in which a large proportion of liquid is removed by filtration and the remaining ice is then fed to a centrifuge.

The draining column may have an input opening at its lower end, means for removing ice at its top end, and filtering means between the upper and lower ends.

The centrifuge may be the usual rotating perforated basket type of centrifuge from which ice is continuously scraped off and washed. For a given output the centrifuge will be much smaller and consequently cheaper to make and operate than a centrifuge required to receive the total ice slurry. The draining tower is a cheap device and the use of such a device in combination with a small centrifuge is very efficient, and likely to remove a higher percentage of solids because if the whole slurry is fed to a centrifuge so there is a tendency to feed it at a rate greater than its most efficient solids-removal rate.

The slurry may contain 15 to 30% ice e.g. 20%. The wet ice removed from the upper part of the draining tower may contain at least 60% ice or preferably at least 75%.

The invention will be further described by way of example with reference to the accompanying diagrammatic drawing.

A vertical draining tank 10 has an inlet 11 for ice slurry coming from a crystallizer 14. The ice fills the upper part of the column of slurry down to a level 12. The ice drains so that the lower part of the column 13 is mainly water. Liquid is filtered off through a filter medium 15 arranged in the wall of the tower between the upper end lower ends thereof. The liquid passing through the filter medium 15 passes into an annular channel 17 and is carried away by a pipe 18. At the top of the column is an ice scraper 20 carried on a rotating spindle 21. The wet ice gravitates down a channel 22 into a centrifuge 23. Wash water is fed into the centrifuge at 24 and leaves at 25. Ice is fed out at 26 and mother liquor leaves at 27.

The apparatus and process may otherwise be the same for example as described in my British Pat. No. 1199563 or in the specification of an application filed concurrently herewith.

I claim:

1. Apparatus for concentration of aqueous solutions comprising:
   (a) a crystallizer,
   (b) a draining tower connected to the crystallizer to receive ice-liquid slurry forced thereto from said crystallizer;
   (c) filtering outlet means in said tower for removing filtered liquid from said tower;
   (d) a centrifuge, and
   (e) means for transferring ice from said tower to said centrifuge,
   (f) said connection to said tower of said crystallizer being positioned below said filtering outlet means and said means for transferring being positioned above said filtering outlet means.

2. Apparatus as in claim 1 wherein said centrifuge is a rotating basket centrifuge.

3. Apparatus as in claim 2, wherein said centrifuge separates the ice from liquids thereon, said centrifuge including, means for adding wash water to the ice therein, wash water removal means, ice removal means and mother liquor removal means.

* * * * *